United States Patent
Vizer et al.

(10) Patent No.: US 11,113,317 B2
(45) Date of Patent: Sep. 7, 2021

(54) GENERATING PARSING RULES FOR LOG MESSAGES

(71) Applicant: HEWLETT PACKARD ENTERPRISE DEVELOPMENT LP, Houston, TX (US)

(72) Inventors: Fernando Vizer, Yehud (IL); Ofra Pavlovitz, Yehud (IL); Eran Bentziony, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 683 days.

(21) Appl. No.: 15/280,920

(22) Filed: Sep. 29, 2016

(65) Prior Publication Data

US 2018/0089304 A1    Mar. 29, 2018

(51) Int. Cl.
  *G06F 16/28*  (2019.01)
  *G06F 16/2455*  (2019.01)

(52) U.S. Cl.
  CPC ...... *G06F 16/287* (2019.01); *G06F 16/24554* (2019.01); *G06F 16/24564* (2019.01)

(58) Field of Classification Search
  CPC ......... G06F 17/30601; G06F 17/30486; G06F 17/30507; G06F 17/30864; G06F 17/30598
  USPC ........................................................ 707/731
  See application file for complete search history.

(56) References Cited

U.S. PATENT DOCUMENTS

| | | | |
|---|---|---|---|
| 8,209,567 B2 * | 6/2012 | Cohen ................. | G06F 11/3476 714/26 |
| 9,262,519 B1 * | 2/2016 | Saurabh ................ | G06F 16/285 |
| 2005/0022207 A1 * | 1/2005 | Grabarnik ............... | G06F 8/427 719/313 |
| 2012/0246303 A1 * | 9/2012 | Petersen ........... | G06F 17/30144 709/224 |
| 2013/0268260 A1 * | 10/2013 | Lundberg ................ | G06F 17/28 704/8 |
| 2014/0006010 A1 * | 1/2014 | Nor ....................... | G06F 40/211 704/9 |
| 2014/0188459 A1 * | 7/2014 | Fink ....................... | G06F 40/30 704/9 |
| 2015/0370885 A1 * | 12/2015 | Kushmerick ......... | G06F 16/353 707/737 |

* cited by examiner

*Primary Examiner* — Hosain T Alam
*Assistant Examiner* — Nicholas E Allen

(57) ABSTRACT

A plurality of log messages may be clustered into a plurality of clusters. For each of the plurality of log messages, the log message may be partitioned into a series of substrings. At least two of the plurality of clusters may be selected. For each one of the at least two selected clusters, a parsing rule may be generated corresponding to a plurality of substrings each of which are at a given location of a respective one of the log messages of the plurality of log messages in the one of the selected cluster.

21 Claims, 7 Drawing Sheets

| Cluster ID | Substring Index 1 | Substring Index 2 | Substring Index 3 | Substring Index 4 | Substring Index 5 | Substring Index 6 | Substring Index 7 |
|---|---|---|---|---|---|---|---|
| ▷ 202 | ▷ | ▷ | ▷ | ▷ | ▷ | ▷ | ▷ |
| 1 | 23 | inbound/ pass1 | 10266 | testhost. com | 10.10.0.0 | RECV | user1@host1.com user2@host2.com 2 62 10.10.0.0 |
| 2 | 23 | scan | 26613 | testhost. com | 10.10.0.0 | SCAN | ENC user1@host1.com \| user2@host2.com \| user3@host3.com \| user4@host4.com |
| 1 | 23 | inbound/ pass1 | 10266 | testhost. com | 10.10.0.0 | RECV | user3@host3.com user4@host4.com 2 62 10.10.0.0 |
| 3 | 23 | outbound /smtp | 31445 | testhost. com | 10.10.0.0 | SEND | ENC 1 CE320601EB 250 2.6.0 <B770063F6D5FF74FA109B54222DF30DCD370B6 @MN001E0A005.chsinc.ds> [InternalId=4149642] Queued mail for delivery |
| 2 | 23 | scan | 26613 | testhost. com | 10.10.0.0 | SCAN | ENC user5@host5.com \| user6@host6.com \| user7@host7.com \| user8@host8.com |
| 3 | 23 | outbound /smtp | 31445 | testhost. com | 10.10.0.0 | SEND | ENC 1 CE320601EB 250 2.6.0 <B770063F6D5FF74FA109B54222DF30DCD370B6 @MN001E0A005.chsinc.ds> [InternalId=4149642] Queued mail for delivery |

FIG. 5A

| Cluster ID | Substring Index 1 ▷ 202 | Substring Index 2 ▷ | Substring Index 3 ▷ | Substring Index 4 ▷ | Substring Index 5 ▷ | Substring Index 6 ▷ | Substring Index 7 ▷ |
|---|---|---|---|---|---|---|---|
| 1 | 23 | inbound/pass1 | 10266 | testhost.com | 10.10.0.0 | RECV | user1@host1.com user2@host2.com 2 62 10.10.0.0 ◁ 204 |
| 1 | 23 | inbound/pass1 | 10266 | testhost.com | 10.10.0.0 | RECV | user3@host3.com user4@host4.com 2 62 10.10.0.0 |
| 1 | 23 | inbound/pass1 | 10266 | testhost.com | 10.10.0.0 | RECV | user1@host1.com user2@host2.com 2 62 10.10.0.0 |
| 1 | 23 | inbound/pass1 | 10266 | testhost.com | 10.10.0.0 | RECV | user3@host3.com user4@host4.com 2 62 10.10.0.0 |
| 1 | 23 | inbound/pass1 | 10266 | testhost.com | 10.10.0.0 | RECV | user1@host1.com user2@host2.com 2 62 10.10.0.0 |
| 1 | 23 | inbound/pass1 | 10266 | testhost.com | 10.10.0.0 | RECV | user3@host3.com user4@host4.com 2 62 10.10.0.0 |

GENERATING PARSING RULES FOR LOG MESSAGES

BACKGROUND

In some examples, log messages may be collected from source components of computer systems. The source components may include, for example, hardware and/or software components, such as web services, enterprise applications, storage systems, servers, etc.

BRIEF DESCRIPTION

Some examples are described with respect to the following figures:

FIGS. 5A and 5B illustrate a graphical user interface showing log messages and which is displayed by an output device according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

As discussed earlier, log messages may be collected from the source components of computer systems. A "log message" is a textual message. In some examples, log messages may include human-readable text. In some examples, log messages may indicate events, such as errors, occurring in a computing system. Log messages may, for example, be received as a log stream, e.g. multiple log messages stored in a log file. Log messages may be generated by, stored on, and collected from source components of a computer system such as a computer network, and may be used in system development for debugging and understanding the behavior of a system. These log messages may store a large amount of information describing the behavior of systems. For example, systems may generate thousands or millions of log messages per second.

In some examples, log messages may be classified according to their format so that when new log messages are received, they can be matched with a cluster that contains log messages matching a log message template. However, in some examples, performing such a classification of log messages may be difficult where log messages with different formats are received in a log message stream.

Accordingly, the present disclosure provides examples in which classification of log messages with different formats in a log message stream may be performed. This may, for example, involve generating multiple parsing rules according to the methods described herein. As understanding log messages may be helpful for a broad array of IT management tasks, including debugging and understanding the behavior of a computer system, the functionality of such computer systems may be enhanced by the ability to better classify these log messages.

Figure 1:
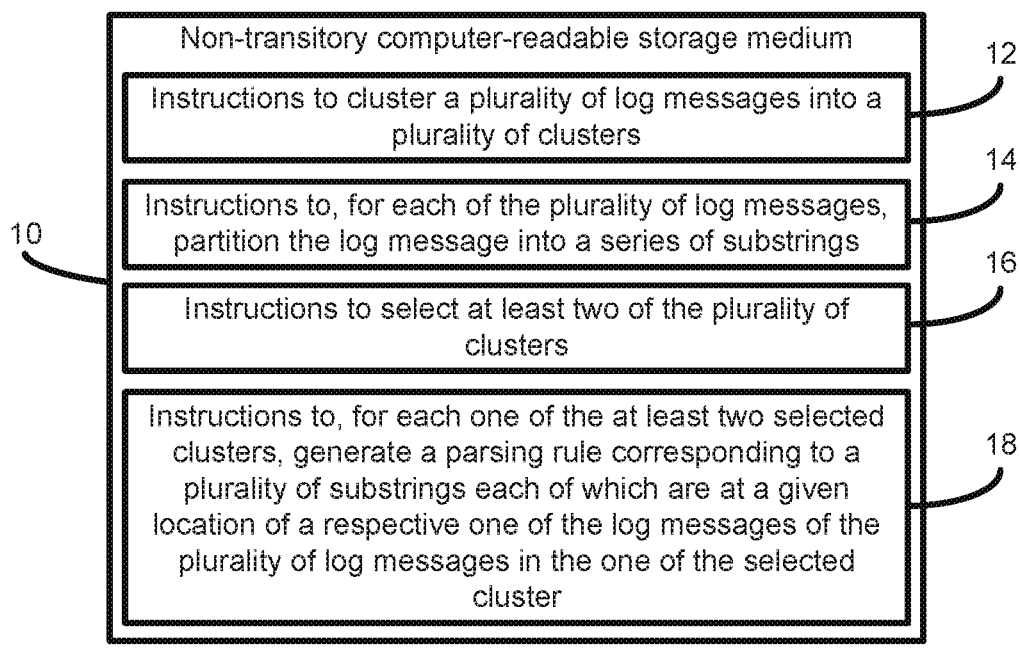
FIG. 1 is a block diagram illustrating a non-transitory computer readable storage medium according to some examples.

FIG. 1 is a block diagram illustrating a non-transitory computer readable storage medium 10 according to some examples. The non-transitory computer readable storage medium 10 may include instructions 12 executable by a processor to cluster a plurality of log messages into a plurality of clusters. The non-transitory computer readable storage medium 10 may include instructions 14 executable by a processor to, for each of the plurality of log messages, partition the log message into a series of substrings. The non-transitory computer readable storage medium 10 may include instructions 16 executable by a processor to select at least two of the plurality of clusters. The non-transitory computer readable storage medium 10 may include instructions 18 executable by a processor to, for each one of the at least two selected clusters, generate a parsing rule corresponding to a plurality of substrings each of which are at a given location of a respective one of the log messages of the plurality of log messages in the one of the selected cluster.

Figure 2:
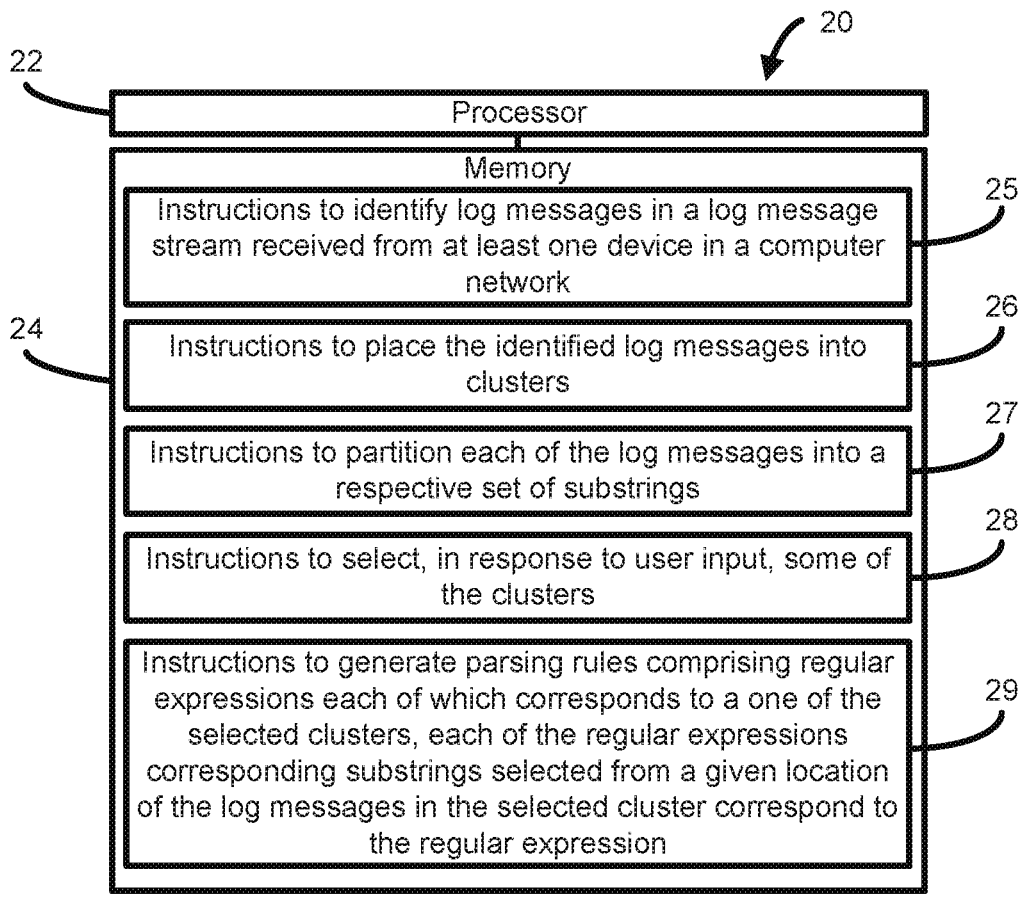
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 25 executable by the processor to identify log messages in a log message stream received from at least one device in a computer network. The memory 24 may include instructions 26 executable by the processor to place the identified log messages into clusters. The memory 24 may include instructions 27 executable by the processor to partition each of the log messages into a respective set of substrings. The memory 24 may include instructions 28 executable by the processor to select, in response to user input, some of the clusters. The memory 24 may include instructions 29 executable by the processor to generate parsing rules comprising regular expressions each of which corresponds to a one of the selected clusters, each of the regular expressions corresponding substrings selected from a given location of the log messages in the selected cluster correspond to the regular expression.

Figure 3:
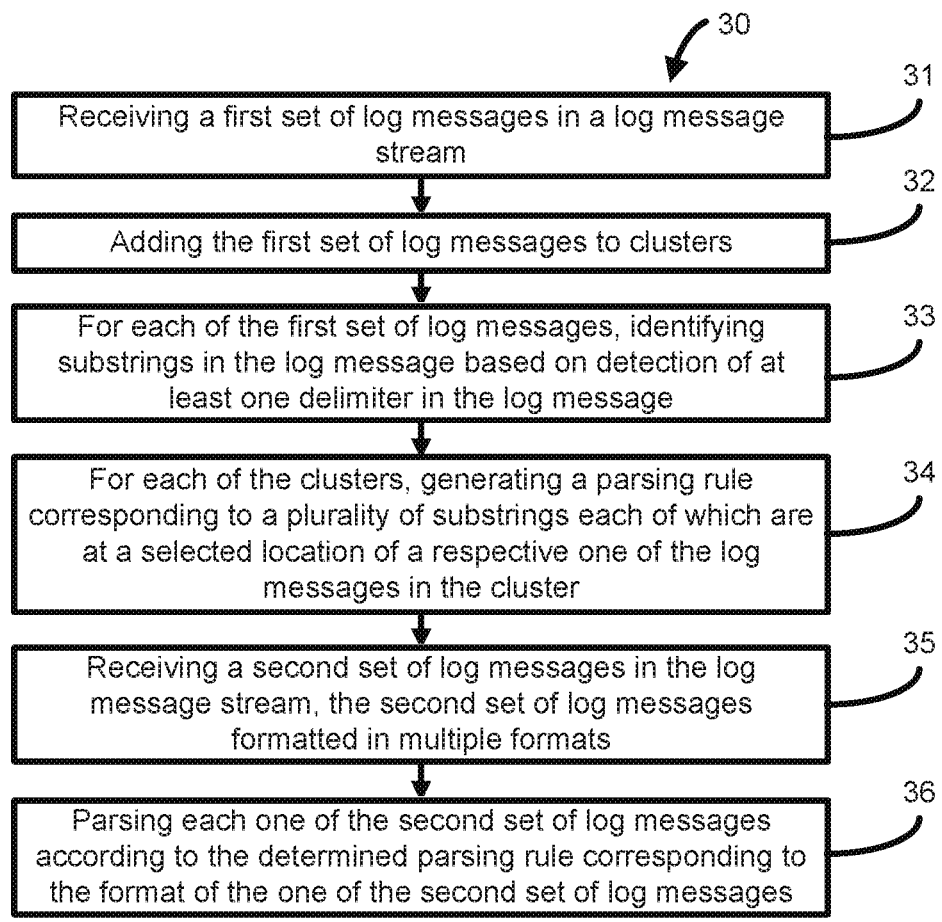
FIGS. 3 and 6 are flow diagrams illustrating methods according to some examples.

FIG. 3 is a flow diagram illustrating a method 30 according to some examples. The following may be performed by a processor. The method 30 may include: at 31, receiving a first set of log messages in a log message stream; at 32, adding the first set of log messages to clusters; at 33, for each of the first set of log messages, identifying substrings in the log message based on detection of at least one delimiter in the log message; at 34, for each of the clusters, generating a parsing rule corresponding to a plurality of substrings each of which are at a selected location of a respective one of the log messages in the cluster; at 35, receiving a second set of log messages in the log message stream, the second set of log messages formatted in multiple formats; and at 36, parsing each one of the second set of log messages according to the determined parsing rule corresponding to the format of the one of the second set of log messages.

Figure 4:
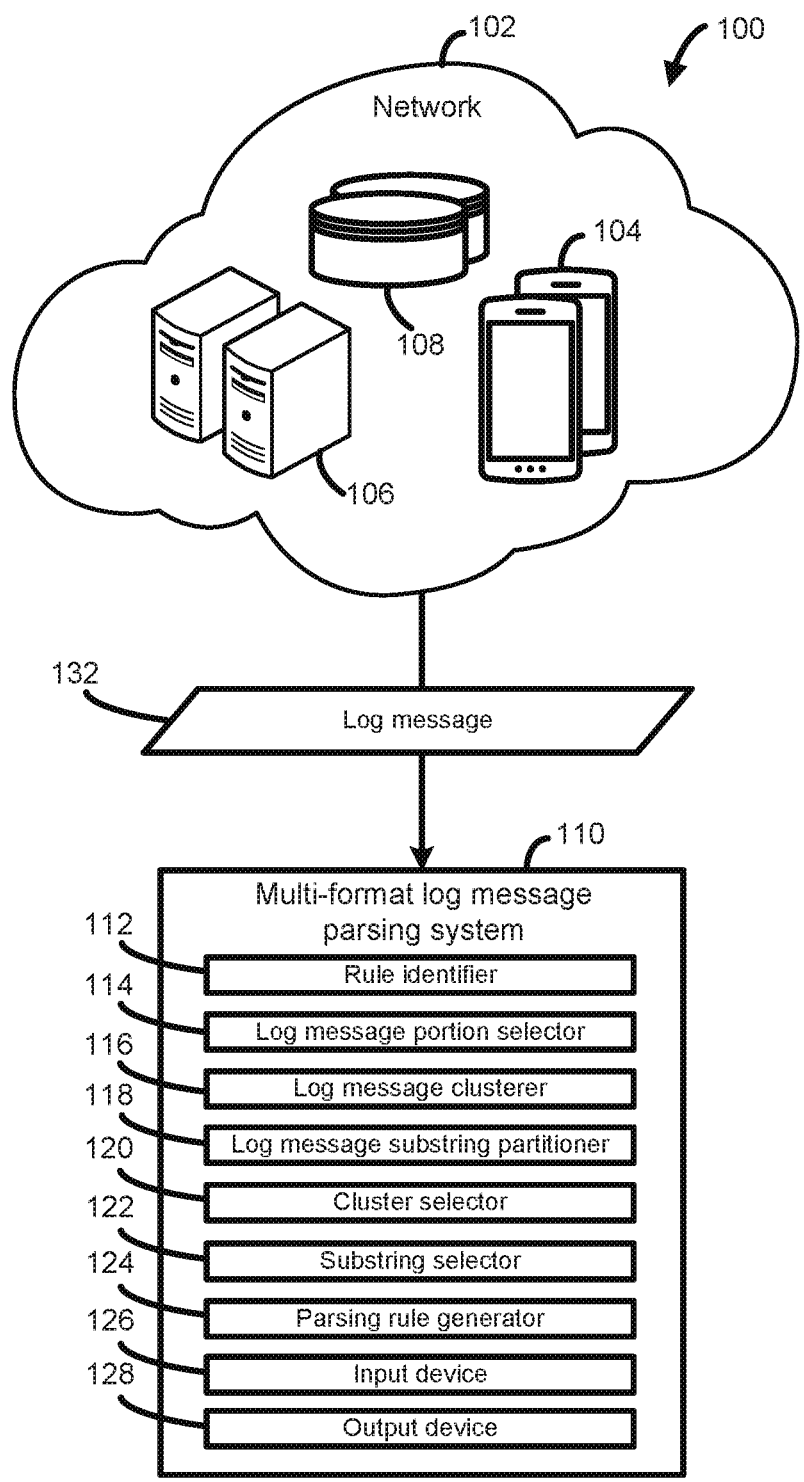

FIG. 4 is a block diagram illustrating a system 100 according to some examples. The system 100 includes a network 102 that may include an application layer that includes applications 104 (e.g. mobile applications, web applications, on-premise applications, cloud based applications, etc., which may be used by end users), e.g. running on user computing devices or other computing devices such as servers. The network 102 may include a computing layer including computing devices 106 such as servers, and a database layer including databases 108. Each of the databases 108 may be accessible to each of the applications 104, for example through the computing devices 106. Other devices may also be present in the network 102, such as printing devices, etc. The network 102 may, for example, be a local area network (LAN), wide area network (WAN), the Internet, or any other network. In some examples, the network 102 may comprise components of an information technology (IT) infrastructure of an organization, such as a data center.

The system 100 may include a multi-format log message parsing system 110. The multi-format log message parsing system 110 may include a rule identifier 112, log message portion selector 114, log message clusterer 116, log message substring partitioner 118, cluster selector 120, substring selector 122, and parsing rule generator 124. The multi-format log message parsing system 110 may support direct user interaction. For example, the multi-format log message parsing system 110 may include user input device 126, such as a keyboard, touchpad, buttons, keypad, dials, mouse, track-ball, card reader, or other input devices. Additionally, the multi-format log message parsing system 110 may include output device 128 such as a liquid crystal display (LCD), video monitor, touch screen display, a light-emitting diode (LED), or other output devices. The output devices may be responsive to instructions to display a visualization including textual and/or graphical data including representations of log messages, clusters, and probabilistic data structures during any part of the processes described herein.

In some examples, components of the multi-format log message parsing system 110, including the rule identifier 112, log message portion selector 114, log message clusterer 116, log message substring partitioner 118, cluster selector 120, substring selector 122, and parsing rule generator 124, may each be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components of the multi-format log message parsing system 110 mentioned above may include hardware features to perform processes described herein, such as a logical circuit, application specific integrated circuit, etc. In some examples, multiple components may be implemented using the same computing system features or hardware.

In some examples, the multi-format log message parsing system 110 may receive a log message stream including log messages 132 from source components in a computer system such as the network 102. Table 1 illustrates six example log messages 132 in a log message stream collected from the network 102, although any number of log messages 132 may be collected. For example, thousands or millions of log messages 132 may be collected. As shown in Table 1, the log message stream including the log messages 132 may be in a raw format, such that different log messages 132 may not be partitioned from each other, and individual log messages 132 may not be parsed or tokenized.

In some examples, each log message 132 may include fixed parameters, variable parameters, or both. That is, some of the substrings may include fixed parameters that do not take different values in different log messages represented by the same log message template, while other substrings include variable parameters. Additionally, a variable parameter is a variable string taking different values in different log messages represented by the same log message template. For example, variable parameters may comprise a varying textual (e.g. numerical) metrics. Each log message 132 may, for example, include a description of an event associated with the source component such as an error.

In some examples, a log message database of multi-format log message parsing system 110 may store the log messages stream including the log messages 132. When additional log messages 132 are received as part of the log message stream, they may be stored in the log message database.

TABLE 1

Log message stream including collected log messages 132

<23>inbound/pass1[10266]: testhost.com[10.10.0.0] 1363801828-
04da8e281ae6390001-qsW31L 1363801828 1363801828
RECV user1@host1.com user2@host2.com 2 62 10.10.0.0
<23>scan[26613]: testhost.com[10.10.0.0] 1363801807-
04da8e281ae6380001-IAKewu 1363801820 1363801821 SCAN ENC
user1@host1.com | user2@host2.com | user3@host3com |
user4@host4.com
<23>inbound/pass1[10266]: testhost.com[10.10.0.0] 1363801828-
04da8e281ae6390001-qsW31L 1363801828 1363801828 RECV
user3@host3.com user4@host4.com 2 62 10.10.0.0
<23>outbound/smtp[31445]: 10.10.0.0 1363801807-
04da8e281ae6380001-IAKewu 0 0 SEND ENC 1
CE320601EB 250 2.6.0
<B770063F6D5FF74FA109B54222DF30DCD370B6@
MN001E0A005.chsinc.ds>
[InternalId=4149642] Queued mail for delivery
<23>scan[26613]: testhost.com[10.10.0.0] 1363801807-
04da8e281ae6380001-IAKewu 1363801820 1363801821 SCAN ENC
user5@host5.com | user6@host6.com | user7@host7.com |
user8@host8.com
<23>outbound/smtp[31445]: 10.10.0.0 1363801807-
04da8e281ae6380001-IAKewu 0 0 SEND ENC 1
CE320601EB 250 2.6.0
<B770063F6D5FF74FA109B54222DF30DCD370B6@
MN001E0A005.chsinc.ds>
[InternalId=4149642] Queued mail for delivery In some examples, the rule identifier 112 may determine a log message identification rule to identify individual log messages 132 in the log message stream. For example, the log message identification rule may be a rule representing that a delimiter separates log messages 132 in the log message stream. Therefore, a delimiter may be detected. A delimiter is a substring that separates other substrings in the log message stream. Since the delimiter between log messages 132 may not be known in advance, detecting the delimiter may facilitate in detecting the individual log messages 132 in the log message stream.

An example candidate delimiter is a "new line" character. In some examples, it may be assumed that a "new line" character appears with a predetermined frequency (e.g. a threshold number of "new line" characters per a certain number of characters in the log message stream), and therefore the rule identifier 112 may determine that a substring is a delimiter in response to a threshold percentage of characters, and/or a regular frequency of characters (e.g. a regular appearance of the delimiter every threshold number of characters such as within every 100 characters), appearing in the log message stream.

Additional techniques that may be implemented by the rule identifier 112 include techniques described in U.S. Patent Publication No. 2014/000,6010 filed on Jun. 27, 2012 and titled "Parsing rules for data", which is incorporated by reference herein in its entirety.

In some examples, the rule identifier 112 may output the determined log message identification rule to the output device 128 for display, such that a user may select the identification rule. Then, the rule identifier 122, via the input device 126, may receive user input representing a selection of the log message identification rule. The rule identifier 112 may, based on the user input, delimit and identify log messages 132 using the log message identification rule. An example delimiting and identification of the six log messages 132 in Table 1 is shown in Table 2.

TABLE 2

Log message stream including identified log messages 132

<23>inbound/pass1[10266]: testhost.com[10.10.0.0] 1363801828-
04da8e281ae6390001-qsW31L 1363801828
1363801828 RECV user1@host1.com
user2@host2.com 2 62 10.10.0.0
<23>scan[26613]: testhost.com[10.10.0.0] 1363801807-
04da8e281ae6380001-IAKewu
1363801820 1363801821 SCAN ENC user1@host1.com |
user2@host2.com | user3@host3.com | user4@host4.com
<23>inbound/pass1[10266]: testhost.com[10.10.0.0] 1363801828-
04da8e281ae6390001-qsW31L 1363801828 1363801828
RECV user3@host3.com user4@host4.com 2 62 10.10.0.0
<23>outbound/smtp[31445]: 10.10.0.0 1363801807-
04da8e281ae6380001-IAKewu 0 0
SEND ENC 1 CE320601EB 250 2.6.0
<B770063F6D5FF74FA109B54222DF30DCD370B6@
MN001E0A005.chsinc.ds>
[InternalId=4149642] Queued mail for delivery
<23>scan[26613]: testhost.com [10.10.0.0] 1363801807-
04da8e281ae6380001-IAKewu
1363801820 1363801821 SCAN ENC user5@host5.com |
user6@host6.com | user7@host7.com | user8@host8.com
<23>outbound/smtp[31445]: 10.10.0.0 1363801807-
04da8e281ae6380001-IAKewu 0 0
SEND ENC 1 CE320601EB 250 2.6.0
<B770063F6D5FF74FA109B54222DF30DCD370B6@
MN001E0A005.chsinc.ds>
[InternalId=4149642] Queued mail for delivery In some examples, the log message portion selector 114 may output the identified log messages 132 to the output device 128 for display, such that a user may select, for each log message 132, a portion (i.e. subset) of the log messages 132 that includes a substring or substrings that may be used for further analysis, including clustering. Then, the log message portion selector 114, via the input device 126, may receive user input representing a selection of the portions. For each log message 132, the selected portion may correspond to substrings representing a particular event (e.g. error), as opposed to metadata such as timestamps, source component ID, etc.

In some examples, the log message clusterer 116 may cluster (e.g. place) the log messages 132 into clusters. Each cluster may be associated with a representative log message, and each new log message 132 may be added to a cluster in response to that log message 132 having a threshold degree of similarity to a representative log message of that cluster. If a new log message 132 does not have a threshold degree of similarity with any representative log messages, then the new log message 132 may be classified into a new cluster, and the new log message 132 may serve as the representative log message for that cluster.

The threshold level of similarity may be determined using a similarity function. The relevance of the similarity in log messages 132 may be based on an assumption that log messages produced by a same template, although unknown in advance, may be identical in many of the words, with differences at various variable parameters.

In some examples, the similarity function may be an order-sensitive cosine similarity function defining a distance between two log messages. Such a similarity function may take the form $<\text{text}_1, \text{text}_2> = \text{substring}_{12}/\sqrt{\text{substring}_1 \cdot \text{substring}_2}$, where $\text{substring}_{12}$ is the number of identical substrings comparing each substring position of log message 1 (having $\text{text}_1$) and log message 2 (having $\text{text}_2$), and where $\text{substring}_1$ and $\text{substring}_2$ are the numbers of substrings in the respective log messages 1 and 2. A resulting cosine distance may be a number between 0 and 1. When the result is 1, the two log messages are identical, and when the result is 0, the two log messages are completely different. Values between 1 and 0 represent a measure or degree of similarity. In other examples, the similarity function may additionally account for substring insertions and deletions. Various other similarity functions may be used as well. The log message clusterer 116 may determine that log messages are a match if the degree of similarity is greater than a threshold degree of similarity.

In some examples, the $\text{text}_1$ and $\text{text}_2$ for each log message pair being compared may comprise the portions of the log messages 132 selected by the log message portion selector 114. Therefore, the clustering may be performed using subsets of the identified log messages 132 (e.g. the portions representing events and not metadata) rather than the entire log messages 132.

In some examples, one log message 132 in each cluster may serve as a representative log message for that cluster. For example, the representative log message may be the first log message (e.g. has the earliest timestamp) to be included in the cluster. In some examples, when a new log message 132 is received, the log message clusterer 116 may determine whether a new log message 132 belongs in an existing cluster or if a new cluster should be created to include the new log message 132. To perform this task, the existing cluster analyzer 118 may check each existing cluster by comparing the new log message 128 to a representative log message for that existing cluster.

Additional techniques that may be implemented by the log message clusterer 116 include techniques described in U.S. Pat. No. 8,209,567 filed on Jan. 28, 2010 and titled "Message Clustering Of System Event Logs", which is hereby incorporated herein in its entirety.

Table 3 shows an example in which the log messages 132 are clustered into 3 different clusters, each being assigned a respective cluster ID by the log message clusterer 116.

TABLE 3

Clustered log messages 132

| Cluster ID | Log message 132 |
|---|---|
| 1 | <23>inbound/pass1[10266]: testhost.com[10.10.0.0] 1363801828-04da8e281ae6390001-dsW31L 1363801828 1363801828 RECV user1@host1.com user2@host2.com 2 62 10.10.0.0 |
| 2 | <23>scan[26613]: testhost.com[10.10.0.0] 1363801807-04da8e281ae6380001-IAKewu 1363801820 1363801821 SCAN ENC user1@host1.com | user2@host2.com | user3@host3.com | user4@host4.com |
| 1 | <23>inbound/pass1[10266]: testhost.com[10.10.0.0] 1363801828-04da8e281ae6390001-qsW31L 1363801828 1363801828 RECV user3@host3.com user4@host4.com 2 62 10.10.0.0 |
| 3 | <23>outbound/smtp[31445]: 10.10.0.0 1363801807-04da8e281ae6380001-IAKewu 0 0 SEND ENC 1 CE320601EB 250 2.6.0 <B770063F6D5FF74FA109B54222DF30DCD370B6@MN001E0A005.chsinc.ds> [InternalId=4149642] Queued mail for delivery |
| 2 | <23>scan[26613]: testhost.com[10.10.0.0] 1363801807-04da8e281ae6380001-IAKewu 1363801820 1363801821 SCAN ENC user5@host5.com | user6@host6.com | user7@host7.com | user8@host8.com |
| 3 | <23>outbound/smtp[31445]: 10.10.0.0 1363801807-04da8e281ae6380001-IAKewu 0 0 SEND ENC 1 CE320601EB 250 2.6.0 <B770063F6D5FF74FA109B54222DF30DCD370B6@MN001E0A005.chsinc.ds> [InternalId=4149642] Queued mail for delivery |

In some examples, the log message substring partitioner 118 may partition each of the log messages 132 into substrings. Each substring may comprise at least one character.

To detect substrings, delimiters may be detected. A delimiter is a substring that separates other substrings in a log message 132. Example delimiters to be searched in the log messages 132 may include spaces, tabs, forward and backward slashes, exclamation points, number signs, dollar signs, percentage signs, carets, commas, periods, colons, semicolons, at signs, ampersands, equal signs, dashes, underscores, tildes, etc. Each of the substrings may be assigned a substring index (e.g. a number such as 1, 2, 3, etc.) representing the location of the substring in the log message 132 (where lower numbers represent earlier substrings and greater numbers represent later substrings).

FIG. 5A illustrates a graphical user interface 200 showing log messages 132 and which is displayed by the output device 128 according to some examples. As shown in FIG. 5A, the cluster selector 120 of FIG. 4 may output the partitioned substrings of the log messages 132 (ordered by substring index), along with a cluster IDs for each log message 132, to the output device 128 for display. Additionally, as shown in the second column of the graphical interface 200, rows of log messages 132 can be filtered, using a filter 202, by cluster ID or by a value of a substring at a particular substring index.

In some examples, a user may, using the filter 202, select a cluster by filtering the log messages 132 corresponding to a particular cluster ID. Then, the cluster selector 120, via the input device 126, may receive user input representing a selection of the cluster.

FIG. 5B illustrates a graphical user interface 200 showing log messages 132 and which is displayed by the output device 128 according to some examples. As shown in FIG. 5B, the cluster selector 120 of FIG. 4 may, in response to a selection of a cluster, output a list of log messages 132 filtered by the selected cluster ID. In this example, log messages 132 with cluster ID 1 are selected. For illustrative purposes, six log messages 132 in the cluster having cluster ID 1 are shown. The selected cluster may be the one for which parsing rules may be generated by the parsing rule generator 124, as will be described.

In some examples, the substring selector 122 may, for each selected cluster, recommend substrings in the log messages 132 for selection by the user, wherein the recommended substrings correspond to a particular substring index. The recommended substrings may be the substrings that may be parsed by the parsing rule generator 124 if selected. In some examples, the recommendation may be based on detecting that the recommended substrings having variation between them (implying the existence of variable parameters). For example, in FIG. 5B, for the selected cluster having cluster ID 1, the substrings in the log messages 132 corresponding to substring index 7 are recommended using highlighting 204 of the substrings that represent variable parameters, whereas the substrings that do not represent variable parameters are not highlighted. In this way, the substrings corresponding to substring index 7 may be recommended because they contain more variable parameters (e.g. user1@host1.com, user2@host2.com, user3@host3.com, and user4@host4.com) than substrings corresponding to other substring indexes. In the example of FIG. 5B, the substrings 2, 62, and 10.10.0.0 are fixed parameters rather than variable parameters, and therefore are not highlighted. In some examples, the recommendation may be based on detecting that the recommended substrings having a threshold length, or based on other factors. In some examples, the substring selector 122, via the input device 126, may receive user input representing a selection of the recommended substrings. In other examples, the user may select substrings other than the recommended substrings.

In some examples, the parsing rule generator 124 may generate a parsing rule for the selected group of substrings of the log messages 132 corresponding to the selected cluster. The parsing rule may be a regular expression (also known as a regex) that corresponds to each of the selected substrings in the selected cluster. In the example of FIG. 5b, the regular expression corresponds to substring index 7 in the cluster having cluster ID 1. In this example, the regular expression may be ([A-Z]+)\s\([a-z]+)@(([a-z\.]+)\s([a-z]+) @(([a-z\.]+)\s(\d+)\s(\d+)\s([0-9\.]+).

In other examples, a regular expression may be generated that corresponds to the entire log messages 132 in the selected cluster (e.g. including each of the substrings having substring indexes 1-7 in FIG. 5B). In these examples, the substring selector 122 may not be used.

In some examples, the parsing rule generator 124 may output the generated regex to the output device 128 for display, such that a user may approve, or edit and approve, the parsing rule (e.g. regex). Then, the parsing rule generator 124, via the input device 126, may receive user input representing an approval of the regex, or an edit of the regex (in cases where the regex may be manually changed to better correspond to log messages 132 in a cluster) and an approval of the regex. Once the parsing rule is approved, the parsing rule generator 124 may save the parsing rule to a parsing rule database in the multi-format log message parsing system 110.

In some examples, additional regexes may then be generated for different clusters. For example, if there are 10 clusters, then a corresponding regex may be generated for each of the 10 clusters (10 total regexes). This may, for example, be done by repeating the elements performed by the cluster selector 120, substring selector 124, and parsing rule generator 126. The system may do this for any number of clusters, and therefore any number of regexes may be generated (e.g. as many as requested by the user). Once the regexes are generated, when new log messages 132 are received, they may be classified into clusters based on substrings in the new log messages 132 matching a given regex associated with a given cluster.

Figure 6:
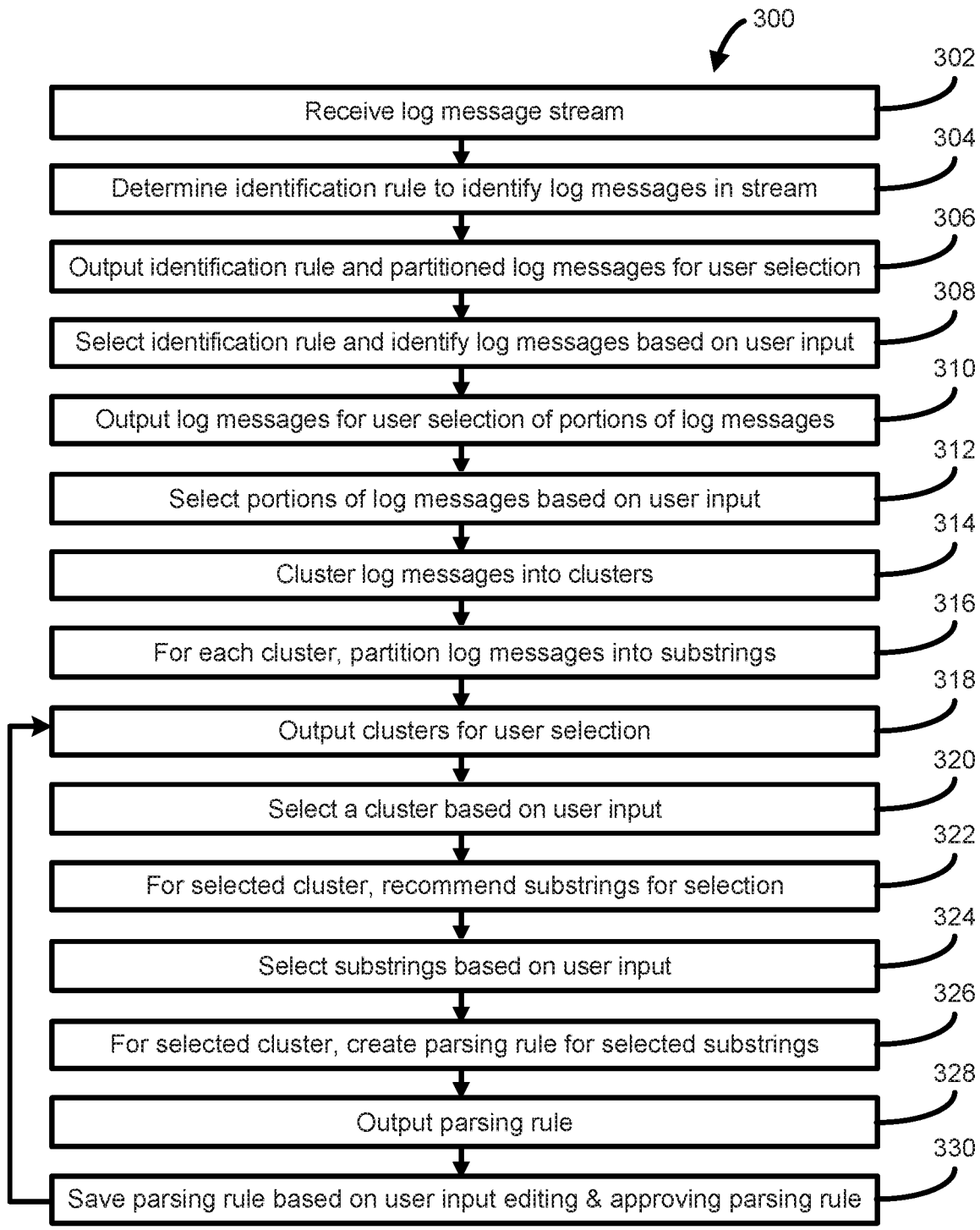

FIG. 6 is a flow diagram illustrating a method 300 according to some examples. In some examples, the orderings shown may be varied, some elements may occur simultaneously, some elements may be added, and some elements may be omitted. In describing FIG. 6, reference will be made to elements described in FIGS. 4, 5A, and 5B. In examples, any of the elements described earlier relative to FIGS. 4, 5A, and 5B may be implemented in the process shown in and described relative to FIG. 6.

At 302, the multi-format log message parsing system 110 may receive a log message stream including log messages 132 from source components in a computer system such as the network 102. Any processes previously described as implemented in receiving the log messages 132 may be implemented at 302. The method 300 may proceed to 304.

At 304, the rule identifier 112 may determine a log message identification rule to identify individual log messages 132 in the log message stream. Any processes previously described as implemented by the rule identifier 112 may be implemented at 304. The method 300 may proceed to 306.

At 306, the rule identifier 112 may output the determined log message identification rule to the output device 128 for display, such that a user may select the identification rule.

Any processes previously described as implemented by the rule identifier 112 may be implemented at 306. The method 300 may proceed to 308.

At 308, the rule identifier 112 may, based on the user input, delimit and identify log messages 132 using the log message identification rule. Any processes previously described as implemented by the rule identifier 112 may be implemented at 308. The method 300 may proceed to 310.

At 310, the log message portion selector 114 may output the identified log messages 132 to the output device 128 for display, such that a user may select, for each log message 132, a portion (i.e. subset) of the log messages 132 that includes a substring or substrings that may be used for further analysis, including clustering. Any processes previously described as implemented by the log message portion selector 114 may be implemented at 310. The method 300 may proceed to 312.

At 312, the log message portion selector 114, via the input device 126, may receive user input representing a selection of the portions. Any processes previously described as implemented by the log message portion selector 114 may be implemented at 312. The method 300 may proceed to 314.

At 314, the log message clusterer 116 may cluster (e.g. place) the log messages 132 into clusters. Any processes previously described as implemented by the log message clusterer 116 may be implemented at 314. The method 300 may proceed to 316.

At 316, the log message substring partitioner 118 may partition each of the log messages 132 into substrings. Any processes previously described as implemented by the log message substring partitioner 118 may be implemented at 316. The method 300 may proceed to 318.

At 318, the cluster selector 120 may output the partitioned substrings of the log messages 132 (ordered by substring index), along with a cluster IDs for each log message 132, to the output device 128 for display. Any processes previously described as implemented by the cluster selector 120 may be implemented at 318. The method 300 may proceed to 320.

At 320, the cluster selector 120, via the input device 126, may receive user input representing a selection of the cluster. Any processes previously described as implemented by the cluster selector 120 may be implemented at 320. The method 300 may proceed to 322.

At 322, the substring selector 122 may, for each selected cluster, recommend substrings in the log messages 132 for selection by the user, wherein the recommended substrings correspond to a particular substring index. Any processes previously described as implemented by the substring selector 122 may be implemented at 322. The method 300 may proceed to 324.

At 324, the substring selector 122, via the input device 126, may receive user input representing a selection of the substrings. Any processes previously described as implemented by the substring selector 122 may be implemented at 324. The method 300 may proceed to 326.

At 326, the parsing rule generator 124 may generate a parsing rule for the selected group of substrings of the log messages 132 corresponding to the selected cluster. Any processes previously described as implemented by the parsing rule generator 124 may be implemented at 326. The method 300 may proceed to 328.

At 328, the parsing rule generator 124 may output the generated regex to the output device 128 for display, such that a user may approve, or edit and approve, the parsing rule. Any processes previously described as implemented by the parsing rule generator 124 may be implemented at 328. The method 300 may proceed to 330.

At 330, once the parsing rule is approved, the parsing rule generator 124 may save the parsing rule to a parsing rule database in the multi-format log message parsing system 110. Any processes previously described as implemented by the parsing rule generator 124 may be implemented at 330.

In some examples, based on user input requesting generation of additional parsing rules for additional clusters, the method 300 may return to 318 to repeat 318 to 330. In this way, additional regexes may then be generated for different clusters. The method 300 may complete at 330 if the user input represents that no additional parsing rules are to be generated.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium that stores instructions that, when executed by a processor, cause the processor to:

cluster a plurality of log messages into a plurality of clusters, wherein the plurality of clusters includes a given cluster, and the given cluster includes a set of log messages of the plurality of log messages;

partition the log messages of the set of log messages into a plurality of substrings;

select the given cluster;

select a subset of substrings from the plurality of substrings, wherein the selection of the subset of substrings comprises:

for the given cluster, providing data to represent a recommendation of the subset of substrings for selection on a display, the recommendation being based on one or more of the substring being capable of being parsed if selected, an identity of one or more variables in the subset of substrings, the substring corresponding to a particular substring index, and the substring having at least a threshold length; and selecting the subset of substrings from the plurality of substrings based on a first user input; and based on the selected subset of substrings, generate a parsing rule for the plurality of substrings.

2. The non-transitory computer-readable storage medium of claim 1, wherein the particular substring index represents a location of a selected substring in a selected log message, wherein the parsing rule comprises a regular expression that corresponds to each of the substrings in the selected subset of substrings, wherein the plurality of log messages are not tokenized, wherein the plurality of log messages comprise a variable parameter including a variable string taking different values in different log messages represented by a common log message template, and wherein the instructions, when executed by a processor, further cause the processor to:

determine a log message identification rule to identify individual log messages in a log message stream comprising the plurality of log messages, wherein the log message identification rule represents that a delimiter substring separates other substrings in the log message stream, and the log message identification rule is created in response to a threshold percentage of characters and/or a regular frequency of characters in the delimiter substring appearing the log message stream; and based on user input, output a subset of the log message stream for further analysis, wherein the subset comprises the plurality of log messages and at least one of the log messages in the log message stream is omitted from the subset.

3. The non-transitory computer-readable storage medium of claim 1 wherein the instructions, when executed by the processor, further cause the processor to identify a variable parameter in the subset of substrings and generate the parsing rule based on the variable parameter and to assign to each cluster of the plurality of clusters a representative log message and add a selected log message to the given cluster in response to the selected log message having a threshold degree of similarity to the representative log message corresponding to the given cluster, the threshold degree of similarity being based on an order-sensitive similarity cosine function, wherein the threshold degree of similarity requires the representative log message corresponding to the given cluster and the selected log message to be produced by a same template.

4. The non-transitory computer-readable storage medium of claim 1 wherein different clusters have different parsing rules and further comprising instructions executable by the processor to:

receive a log message stream comprising the plurality of log messages, wherein the plurality of log messages are in a raw format such that different log messages are not partitioned from each other;

determine a log message identification rule, wherein the determined log message identification rule represents that a delimiter substring separates other substrings in the plurality of log messages, and the log message identification rule is determined in response to a threshold percentage of characters and/or a regular frequency of characters in the delimiter substring appearing the plurality of log messages;

select the log message identification rule from among multiple log message identification rules based on user input; and based on the selected log message identification rule, identify the plurality of log messages in the log message stream.

5. The non-transitory computer-readable storage medium of claim 1, wherein each cluster in the plurality of clusters corresponds to a different log message template and the log messages in the given cluster correspond to a common log message template and wherein the instructions, when executed by the processor, further cause the processor to:

receive a log message stream comprising the plurality of log messages from a network, wherein the plurality of log messages are in a raw format such that different log messages are not partitioned from each other, wherein each log message of the plurality of log messages indicates an error in a computer system, and determine a log message identification rule to identify individual substrings in the plurality of log messages, wherein the log message identification rule represents that a delimiter separates substrings in the plurality of log messages, the delimiter comprising a substring that separates other substrings in the plurality of log messages, and the log message identification rule identifies the delimiter in response to a threshold percentage of characters and/or a regular frequency of characters appearing the plurality of log messages.

6. The non-transitory computer-readable storage medium of claim 1, wherein, before clustering, the plurality of log messages are in a raw format such that different log messages are not partitioned from each other, wherein each cluster in the plurality of clusters corresponds to a different log message template and the log messages in the given cluster correspond to a common log message template and wherein the instructions, when executed by the processor, further cause the processor to:

output data to represent a log message identification rule on a display, wherein the log message identification rule represents that a delimiter separates substrings in the plurality of log messages, the delimiter comprising a substring that separates other substrings in the plurality of log messages, wherein selection of the log message identification rule is based on a second user input.

7. The non-transitory computer-readable storage medium of claim 1, wherein, before clustering, the plurality of log messages are in a raw format such that different log messages are not partitioned from each other, wherein each cluster in the plurality of clusters corresponds to a different log message template and the log messages in the given cluster correspond to a common log message template and wherein the instructions, when executed by the processor, further cause the processor to:

receive a log message stream comprising the plurality of log messages;

determine a log message identification rule;

the determined log message identification rule representing that a delimiter separates individual log messages of the plurality of log messages, the delimiter being determined based on one or more of the delimiter appearing with a predetermined frequency and comprising at least a threshold percentage or number of characters;

select the log message identification rule from among multiple log message identification rules based on user input based on the selected log message identification rule, identify the plurality of log messages in the log message stream;

output log messages for user selection of substrings of the plurality of log messages; and
select substrings of the plurality of log messages based on user input;
output data to represent the plurality of log messages on a display; and
select portions of the plurality of log messages based on a second user input, the portions being a subset of the plurality of log messages to be analyzed,
wherein the clustering of the plurality of log messages into the plurality of clusters is to be performed using the portions.

8. The non-transitory computer-readable storage medium of claim 1, wherein, before clustering, the plurality of log messages are in a raw format such that different log messages are not partitioned from each other, wherein each cluster in the plurality of clusters corresponds to a different log message template and the log messages in the given cluster correspond to a common log message template and wherein the instructions, when executed by the processor, further cause the processor to:
output data to represent the plurality of clusters on a display; and
select the given cluster based on a second user input.

9. The non-transitory computer-readable storage medium of claim 8, wherein the instructions, when executed by the processor, further cause the processor to select the given cluster based on input received from a filter on a graphical user interface.

10. The non-transitory computer-readable storage medium of claim 1, wherein the instructions, when executed by the processor, further cause the processor to:
determine the recommendation based on a variation between the subset of substrings, the variation being caused by one or more variables in the subset of substrings.

11. The non-transitory computer-readable storage medium of claim 1, wherein the instructions, when executed by the processor, further cause the processor to:
assign to each cluster of the plurality of clusters a representative log message and add a selected log message to the given cluster in response to the selected log message having a threshold degree of similarity to the representative log message corresponding to the given cluster, wherein the threshold degree of similarity requires the representative log message corresponding to the given cluster and the selected log message to be produced by a same template,
provide data representing a plurality of parsing rules, including the parsing rule for the subset of sub strings; and
save the plurality of parsing rules to a database based on a second user input representing approval of the plurality of parsing rules.

12. The non-transitory computer-readable storage medium of claim 1, wherein the instructions, when executed by the processor, further cause the processor to:
receive new log messages in a log message stream;
apply an identification rule to identify the new log messages in the log message stream;
based on user input, output a subset of the new log messages for further analysis, wherein at least one new log message in the log message stream is omitted from the subset; and
cluster the subset of the new log messages using the parsing rule.

13. The non-transitory computer-readable storage medium of claim 1, wherein the instructions, when executed by the processor, further cause the processor to:
for a given log message of the plurality of log messages, determine a degree of similarity between the given log message and at least one representative log message of a cluster of the plurality of clusters; and
add the given log message to the cluster of the plurality of clusters containing the representative log message.

14. A system comprising:
a processor; and
a memory comprising instructions executable by the processor to:
identify a plurality of log messages in a log message stream received from at least one device in a computer network;
place the plurality of log messages into clusters, wherein the clusters include a given cluster, and the given cluster includes a set of log messages of the plurality of log messages;
partition the log messages of the set of log messages into a plurality of substrings;
select, in response to a first user input, the given cluster;
select a subset of substrings of the plurality of substrings, each of the substrings in the log messages having a substring index representing a location of the respective substring in the log message stream, wherein the selection of the subset of substrings comprises:
for the given cluster, comparing each subset of substrings corresponding to different substring indexes against a selected set of criteria to determine a given subset of substrings for recommendation to a user;
for the given cluster, providing data to represent a recommendation of the given subset of substrings for selection on a display; and
selecting the subset of substrings based on the first user input; and
generate a parsing rule comprising a regular expression corresponding to the given cluster based on the selected subset of substrings.

15. The system of claim 14, wherein the selected set of criteria comprise one or more of the substring being capable of being parsed if selected, an identity of one or more variables in the subset of substrings, the substring corresponding to a particular substring index, and the substring having at least a threshold length, wherein the plurality of log messages are not tokenized, wherein the plurality of log messages comprise a variable parameter including a variable string taking different values in different log messages represented by a common log message template, and wherein the instructions, when executed by the processor, further cause the processor to:
determine a log message identification rule to identify individual log messages in the plurality of log messages;
output data to represent the log message identification rule on a display; and
select the log message identification rule based on a second user input, wherein the log message identification rule represents that a delimiter separates a subset of the plurality of log messages, the delimiter comprising a substring that separates other substrings in the plurality of log messages, and the log message identification rule identifies the delimiter in response to a threshold percentage or number of characters and/or a regular frequency of characters appearing the plurality of log messages.

16. The system of claim 14, wherein the instructions, when executed by the processor, further cause the processor to:
assign to each cluster of the clusters a representative log message and add a selected log message to the given cluster in response to the selected log message having a threshold degree of similarity to the representative log message corresponding to the given cluster, the threshold degree of similarity being based on an order-sensitive similarity cosine function, wherein the threshold degree of similarity requires the representative log message corresponding to the given cluster and the selected log message to be produced by a same template;
provide data to represent the regular expression on a display, the regular expression corresponding to each substring in a selected subset of substrings; and
save the regular expression to a database based on a second user input representing approval of the regular expression.

17. The system of claim 16, wherein different clusters have different parsing rules and wherein the instructions, when executed by the processor, further cause the processor to:
receive a log message stream comprising the plurality of log messages;
determine a log message identification rule, the determined log message identification rule representing that a delimiter separates individual log messages of the plurality of log messages, the delimiter being determined based on one or more of the delimiter appearing with a predetermined frequency and comprising at least a threshold percentage or number of characters;
select the log message identification rule based on user input;
based on the selected log message identification rule, identify the plurality of log messages in the log message stream;
output log messages for user selection of portions of the plurality of log messages; and
select portions of the plurality of log messages based on user input, the portions being a subset of the plurality of log messages;
receive additional log messages in the log message stream; and
cluster the additional log messages using the regular expression.

18. A method comprising:
by a processor:
receiving a first set of log messages in a log message stream comprising a plurality of log messages;
adding the first set of log messages to a plurality of clusters;
for each log message of the first set of log messages, identifying substrings in the log message based on detection of at least one delimiter in the log message;
for each cluster of the plurality of clusters, generating a parsing rule based on a plurality of substrings, wherein each substring of the plurality of substrings is at a selected location of a respective log message of the log messages in the cluster and has a substring index representing the selected location;
determining a recommendation of the plurality of substrings for the each cluster based on a first user input, wherein, for each cluster, comparing each subset of substrings corresponding to different substring indexes against a selected set of criteria to determine a given subset of substrings for the recommendation;
providing data to represent the recommendation for the each cluster for selection on a display;
receiving a second set of log messages in the log message stream, the second set of log messages formatted in multiple formats; and
parsing each log message of the second set of log messages according to the parsing rules.

19. The method of claim 18, wherein the selected set of criteria comprise one or more of the plurality of substrings being capable of being parsed if selected, an identity of one or more variables in the subset of substrings, the substring corresponding to a particular substring index, and the substring having at least a threshold length, and wherein:
each generated parsing rule comprises a regular expression that corresponds to each of the identified substrings in the log message, wherein the plurality of log messages are not tokenized, wherein the plurality of log messages comprise a variable parameter including a variable string taking different values in different log messages represented by a common log message template; and
for the each cluster of the plurality of clusters, the plurality of substrings corresponding to the regular expression comprises variable parameters and further comprising:
determining a log message identification rule to identify individual log messages in the plurality of log messages, wherein the log message identification rule represents that a delimiter separates a subset of the plurality of log messages, the delimiter comprising a substring that separates other substrings in the plurality of log messages, and the log message identification rule identifies the delimiter in response to a threshold percentage and/or number of characters and/or a regular frequency of characters appearing the plurality of log messages.

20. The method of claim 18, wherein different clusters have different parsing rules and further comprising:
receiving a log message stream comprising the plurality of log messages;
determining a log message identification rule;
selecting the log message identification rule based on user input;
based on the selected log message identification rule, identifying the plurality of log messages in the log message stream;
outputting log messages for user selection of portions of the plurality of log messages;
selecting portions of the plurality of log messages based on user input;
providing data to represent the clusters on a display;
selecting, based on a second user input, the plurality of clusters;
for the each cluster, providing data to display a recommendation of the plurality of substrings; and
assigning to each cluster of the plurality of clusters a representative log message and adding a selected log message to the each cluster in response to the selected log message having at least a threshold degree of similarity to the representative log message corresponding to the each cluster, the threshold degree of similarity being based on an order-sensitive similarity cosine function, wherein the threshold degree of similarity requires the representative log message corresponding to the each cluster and the selected log message to be produced by a same template.

21. The non-transitory computer-readable storage medium of claim 1, wherein the instructions, when executed by the processor, further cause the processor to select the subset of substrings based on at least one of identification of variables in the subset of substrings, or a threshold length.

* * * * *